US012475860B2

(12) United States Patent
Chen et al.

(10) Patent No.: US 12,475,860 B2
(45) Date of Patent: Nov. 18, 2025

(54) DISPLAY AND BACKLIGHT COMPENSATION METHOD THEREOF

(71) Applicant: AUO Display Plus Corporation, Hsinchu (TW)

(72) Inventors: Po-Kun Chen, Hsinchu (TW); Ai-Ling Lin, Hsinchu (TW); Ting-Ting Kuo, Hsinchu (TW); Ren-Wei Huang, Hsinchu (TW)

(73) Assignee: AUO Display Plus Corporation, Hsinchu (TW)

( * ) Notice: Subject to any disclaimer, the term of this patent is extended or adjusted under 35 U.S.C. 154(b) by 0 days.

(21) Appl. No.: 19/001,605

(22) Filed: Dec. 26, 2024

(65) Prior Publication Data

US 2025/0124885 A1 Apr. 17, 2025

(30) Foreign Application Priority Data

Dec. 5, 2024 (TW) ................................ 113147322

(51) Int. Cl.
*G09G 3/34* (2006.01)
*G09G 3/20* (2006.01)

(52) U.S. Cl.
CPC ......... *G09G 3/3426* (2013.01); *G09G 3/2007* (2013.01); *G09G 2320/0233* (2013.01); *G09G 2320/0276* (2013.01); *G09G 2320/062* (2013.01); *G09G 2320/0686* (2013.01); *G09G 2360/16* (2013.01)

(58) Field of Classification Search
CPC ............... G09G 3/2007; G09G 3/3426; G09G 2320/0233; G09G 2320/0276; G09G 2320/062; G09G 2320/0686; G09G 2360/16
See application file for complete search history.

(56) References Cited

U.S. PATENT DOCUMENTS 7,265,795 B2 9/2007 Ohyama et al.
10,504,456 B2 * 12/2019 Inokawa .............. G09G 3/3225
10,708,564 B2 * 7/2020 Park ........................ H04N 11/20
12,317,719 B2 * 5/2025 Jo ........................ G09G 3/3233

* cited by examiner

*Primary Examiner* — Gene W Lee

(57) ABSTRACT

A display and a backlight compensation method thereof are provided, wherein the display includes a backlight unit and a driving unit, and the backlight compensation method includes: providing a gamma value of the display; performing local dimming of the backlight unit according to the gamma value; obtaining an area peak luminance of each area in the backlight unit; obtaining a windows size of the backlight unit and a corresponding luminance dependency of windows size; obtaining, by the driving unit, a first display luminance corresponding to each area in the backlight unit according to a product of the area peak luminance of each area and the luminance dependency of windows size; and performing luminance compensation in each area of the backlight unit according to the first display luminance. A backlight compensation method that maintains optical quality is achieved, which can maintain brightness and gamma values under different windows sizes.

10 Claims, 4 Drawing Sheets

DISPLAY AND BACKLIGHT COMPENSATION METHOD THEREOF

CROSS-REFERENCE TO RELATED PATENT APPLICATION

This application claims priority to Taiwan Patent Application No. 113147322, filed on Dec. 5, 2024. The entire contents of Taiwan Patent Application No. 113147322 are incorporated herein by reference.

FIELD OF THE INVENTION

The disclosure relates to a backlight compensation technology, and in particular to a display and a backlight compensation method thereof.

BACKGROUND OF THE INVENTION

Conventional sub-millimeter light-emitting diode (LED) displays may not be able to maintain optical performance in key optical characteristics during local dimming because the dimming algorithms are mainly focused on power saving, for example, the gamma value may change from 2.2 to 2.8 after local dimming, as shown in FIG. 1. This may lead to lower resolution and distortion of image data, for example, darkening of the whole display screen, resulting in distortion of shadow details. In addition, sub-millimeter light-emitting diodes may realize luminance compensation by using an extended light source or by directly increasing luminance of image data, but both will cause generation and/or a substantial increase of a halo, which also causes a reduction in resolution and distortion of the image data.

SUMMARY OF THE INVENTION

The disclosure provides a display and a backlight compensation method thereof, which mainly achieve an adjustable backlight compensation manner that maintains optical quality without reducing the resolution of the image data (i.e., maintaining the resolution of the image data) and can maintain the luminance and the gamma value under different windows sizes.

The disclosure provides a display, including a backlight unit and a driving unit. The backlight unit has first display luminances, a windows size and a corresponding luminance dependency of windows size, and also has a plurality of areas, and each area has an area peak luminance. The driving unit couples the backlight unit and calculates the first display luminance according to a product of each of the plurality of area peak luminances and the luminance dependency of windows size. Each of the first display luminances corresponds to each area in the backlight unit.

In an example of the disclosure, the backlight unit further includes: a black screen grayscale measured value, a white screen grayscale measured value and a second display luminance. The second display luminance is obtained by normalizing a difference between the black screen grayscale measured value and the white screen grayscale measured value as a base number and raising the base number to the power of the gamma value.

The disclosure provides a backlight compensation method of a display. The display has a driving unit and a backlight unit. The backlight compensation method includes: providing a gamma value of the display; performing local dimming of the backlight unit according to the gamma value; obtaining an area peak luminance of each area in the backlight unit; obtaining a windows size of the backlight unit and a corresponding luminance dependency of windows size; obtaining, by the driving unit, a first display luminance corresponding to each area in the backlight unit according to a product of the area peak luminance of each area and the luminance dependency of windows size; and performing luminance compensation in each area of the backlight unit according to the first display luminance.

In an example of the disclosure, the performing the local dimming of the backlight unit in the display according to the gamma value of the display includes: normalizing a difference between a black screen grayscale measured value and a white screen grayscale measured value of the backlight unit as a base number, and raising the base number to the power of the gamma value, thereby obtaining a second display luminance of the backlight unit; and performing the local dimming of the backlight unit based on the second display luminance.

In an example of the disclosure, the gamma value is 2.2.

In an example of the disclosure, the windows size has an inverse relation with the luminance dependency of windows size.

In an example of the disclosure, the windows size is a ratio of a white screen area in the backlight unit to a panel area of the backlight unit.

According to the disclosure, by compensating for the luminance difference after the local dimming of the backlight unit and adjusting the luminance dependency of windows size of the backlight unit from many aspects according to different windows sizes, the optical quality can be maintained without reducing the resolution of the image data, and the luminance and the gamma value can be maintained under different windows sizes.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF PREFERRED EMBODIMENTS

Figure 1:
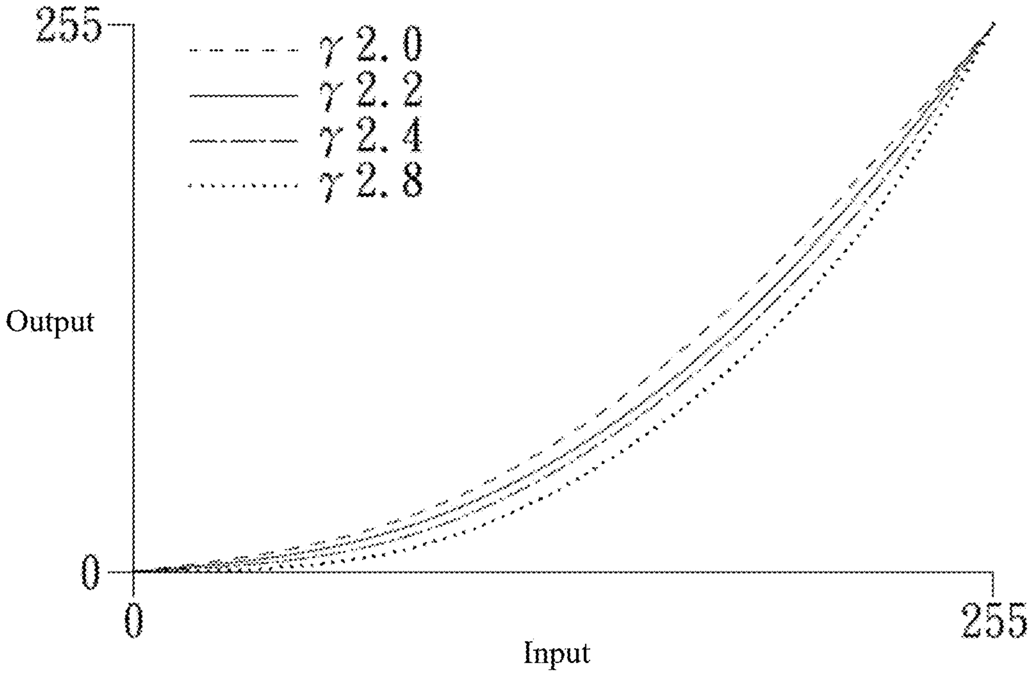
FIG. 1 is a curve graph of a gamma value of a display.

The present invention is particularly described with the following examples, which are merely for illustration. For those skilled in the art, various modifications and refinements can be made without departing from the spirit and scope of this disclosure. Therefore, the scope of protection of this disclosure shall be defined by the appended claims. Throughout the specification and claims, unless clearly specified otherwise, the meaning of "a" and "the" includes "one or at least one" element or component. In addition, as used in the present invention, unless it is clearly apparent from the context that the plural is excluded, the singular also includes the plural elements or components. Additionally, when used in this description and all the following claims, unless clearly specified otherwise, "therein" can mean "in" and "on". The terms used throughout this specification and claims, unless specifically noted, usually have their ordinary meanings in the field, in the context of this disclosure, and in the specific context. Some terms used to describe the present invention will be discussed below or elsewhere in this specification to provide additional guidance to a practitioner regarding the description of the present invention. Any examples given anywhere throughout the specification, including the use of any terms discussed herein, are merely for description and do not limit the scope and meaning of the present invention or any exemplified terms. Likewise, the present invention is not limited to the various embodiments proposed in this specification.

As used herein, the terms "substantially," "around," "about," or "approximately" should generally mean within 20% of a given value or range, preferably within 10%. Furthermore, quantities provided herein may be approximate, meaning that unless specifically stated otherwise, they can be expressed using the terms "about," "around," or "approximately." When a range, a preferred range, or a set of upper and lower ideal values are specified for quantities, concentrations, or other values or parameters, it should be considered that all ranges formed by any pair of upper and lower limits or ideal values are specifically disclosed, regardless of whether such ranges are separately disclosed. For example, if a range of a length is disclosed as X cm to Y cm, it should be considered as disclosing a length of H cm, where H can be any real number between X and Y.

Furthermore, if a term "coupled" or "connected" is used herein, it includes any direct and indirect electrical connection measures. For example, a text describes that a first apparatus is electrically coupled to a second apparatus, meaning that the first apparatus may be connected to the second apparatus directly or indirectly via through other apparatuses or connection measures. Additionally, if a description involves transmission or provision of electrical signals, those skilled in the art should understand that the transmission of electrical signals may be accompanied by attenuation or other non-ideal changes, but unless specifically stated otherwise, the electrical signals transmitted or provided from sources to receiving ends should be considered as substantially the same signal. For example, in a case that an electrical signal S is transmitted (or provided) from an endpoint A of an electronic circuit to an endpoint B, where it may pass by the source and drain terminals of a transistor switch and/or a possible stray capacitor, causing a voltage drop, but if the objective of such design is not to intentionally use the attenuation or other non-ideal changes during transmission (or provision) to achieve certain technical effects, the electrical signal S at the endpoint A and the electrical signal S at the endpoint B of the electronic circuit should be considered substantially the same signal.

It can be understood that the terms "comprising," "including," "having," "containing," "involving," and the like as used herein are open-ended, meaning inclusion but being not limited thereto. Additionally, any embodiment or claim of the present invention does not have to achieve all the objectives, advantages, or features disclosed in the present invention. Furthermore, the abstract and title are only for assisting in patent document searches and are not intended to limit the claims of the present invention.

Figure 2:
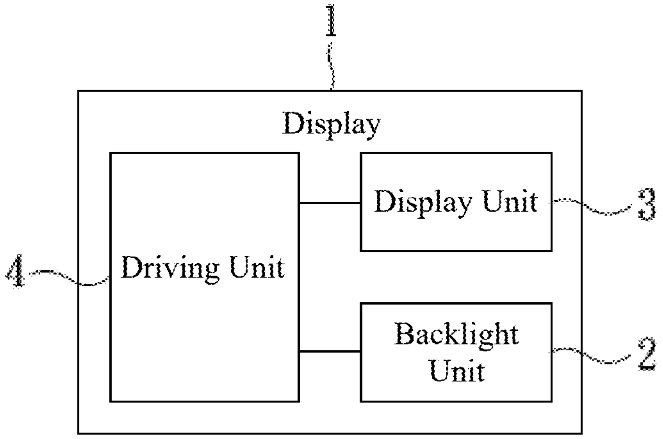
FIG. 2 is a system block diagram of the display according to an example of the disclosure.
Figure 3:
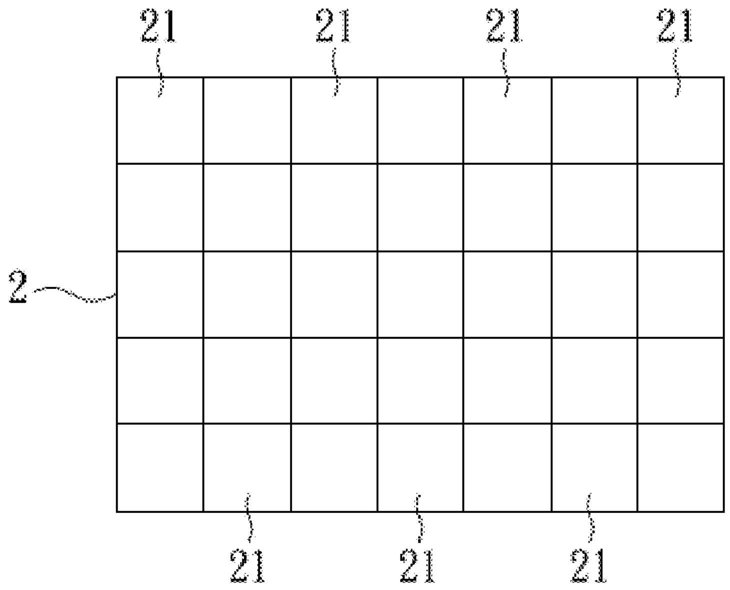
FIG. 3 is a schematic view of a backlight unit according to an example of the disclosure.

FIG. 2 is a system block diagram of a display according to an example of the disclosure. The display 1 provided by this example includes a backlight unit 2, a display unit 3 and a driving unit 4. The backlight unit 2 is a panel including a plurality of sub-millimeter light-emitting diodes to provide backlight of the display 1. The display unit 3 is a panel including a plurality of pixel units to display image data. The driving unit 4 is configured to couple and drive the backlight unit 2 and the display unit 3. It can be noted that the backlight unit 2 has a first display luminance, a whole windows size and a corresponding luminance dependency of windows size, and also has a plurality of areas 21 on the backlight unit 2, as shown in FIG. 3, and each area 21 has an area peak luminance. The driving unit 4 calculates a first display luminance of each area 21 in the backlight unit 2 according to a product of the area peak luminance of each area 21 and the luminance dependency of windows size of the backlight unit 2. In addition, the driving unit 4 is further configured to perform a backlight compensation method.

Figure 4:
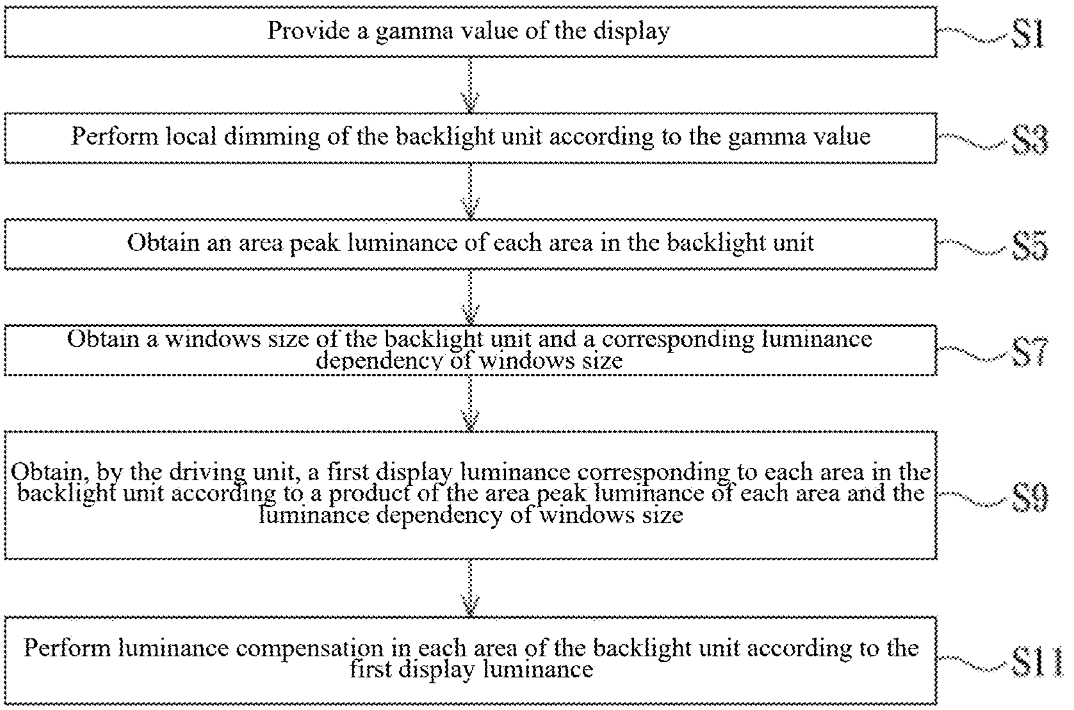
FIG. 4 is a flowchart of a backlight compensation method according to an example of the disclosure.

FIG. 4 is a flowchart of a backlight compensation method according to an example of the disclosure. The backlight compensation method according to this example is performed by the driving unit 4 in the display 1 to include the following operations, where the disclosure does not limit whether the display unit 3 inputs image data. Step S1: Provide a gamma value of the display 1. In this example, the gamma value is 2.2, but those skilled in the art can design different gamma values according to actual needs. Step S3: Perform local dimming of the backlight unit 2 according to the gamma value. Step S5: Obtain an area peak luminance of each area 21 in the backlight unit 2. Step S7: Obtain a windows size of the backlight unit 2 and a corresponding luminance dependency of windows size. Step S9: Obtain, by the driving unit 4, a first display luminance corresponding to each area 21 in the backlight unit 2 according to a product of the area peak luminance of each area 21 and the luminance dependency of windows size. Step S11: Perform luminance compensation in each area 21 of the backlight unit 2 according to the first display luminance.

Figure 5:
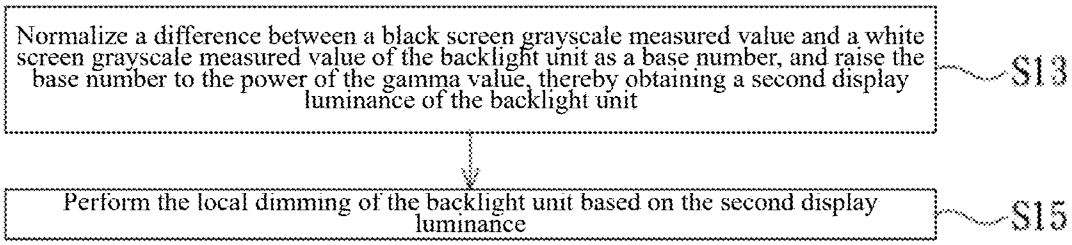
FIG. 5 is a flowchart of performing local dimming of the backlight unit according to the gamma value according to an example of the disclosure.

First, FIG. 5 is a flowchart of performing local dimming of the backlight unit according to the gamma value according to an example of the disclosure. It can be noted that the backlight unit 2 includes not only the first display luminance, the windows size, the luminance dependency of windows size and the area peak luminance, but also a black screen grayscale measured value, a white screen grayscale measured value and a second display luminance, so performing local dimming of the backlight unit according to the gamma value is to perform the following operations based on the black screen grayscale measured value and the white screen grayscale measured value. Step S13: Normalize a difference between the black screen grayscale measured value and the white screen grayscale measured value of the backlight unit 2 as a base number, and raise the base number to the power of the gamma value, thereby obtaining a second display luminance of the backlight unit 2. The formula in step S13 is expressed as $(L0\_m+(L255\_m-L0\_m)*(Ln\_m/255))^{\gamma}$, where L0_m denotes the black screen grayscale measured value of the m-th sub-millimeter light-emitting diode, L255_m denotes the white screen grayscale measured value of the m-th sub-millimeter light-emitting diode, Ln_m denotes the grayscale value of the m-th sub-millimeter light-emitting diode corresponding to the gamma value, n denotes 0 to 255, and γ denotes the gamma value 2.2. In the formula in step S13, 1 sub-millimeter light-emitting diode represents 1 display luminance, which means that the display luminance of the backlight unit 2 includes a plurality of display luminances respectively corresponding to each of a plurality of sub-millimeter light-emitting diodes. Step S15: Perform the local dimming of the backlight unit 2 based on the second display luminance. It can be noted that the size of each area 21 of the backlight unit 2 after the local dimming may be automatically adjusted according to the image data of the display unit 3 or according to the settings of the backlight unit 2, that is, the size of the area 21 may be as small as a sub-millimeter light-emitting diode and as big as the whole panel, and the area 21 may be in different shapes, such as a rectangle and a polygon, but the disclosure is not limited thereto.

Figure 6:
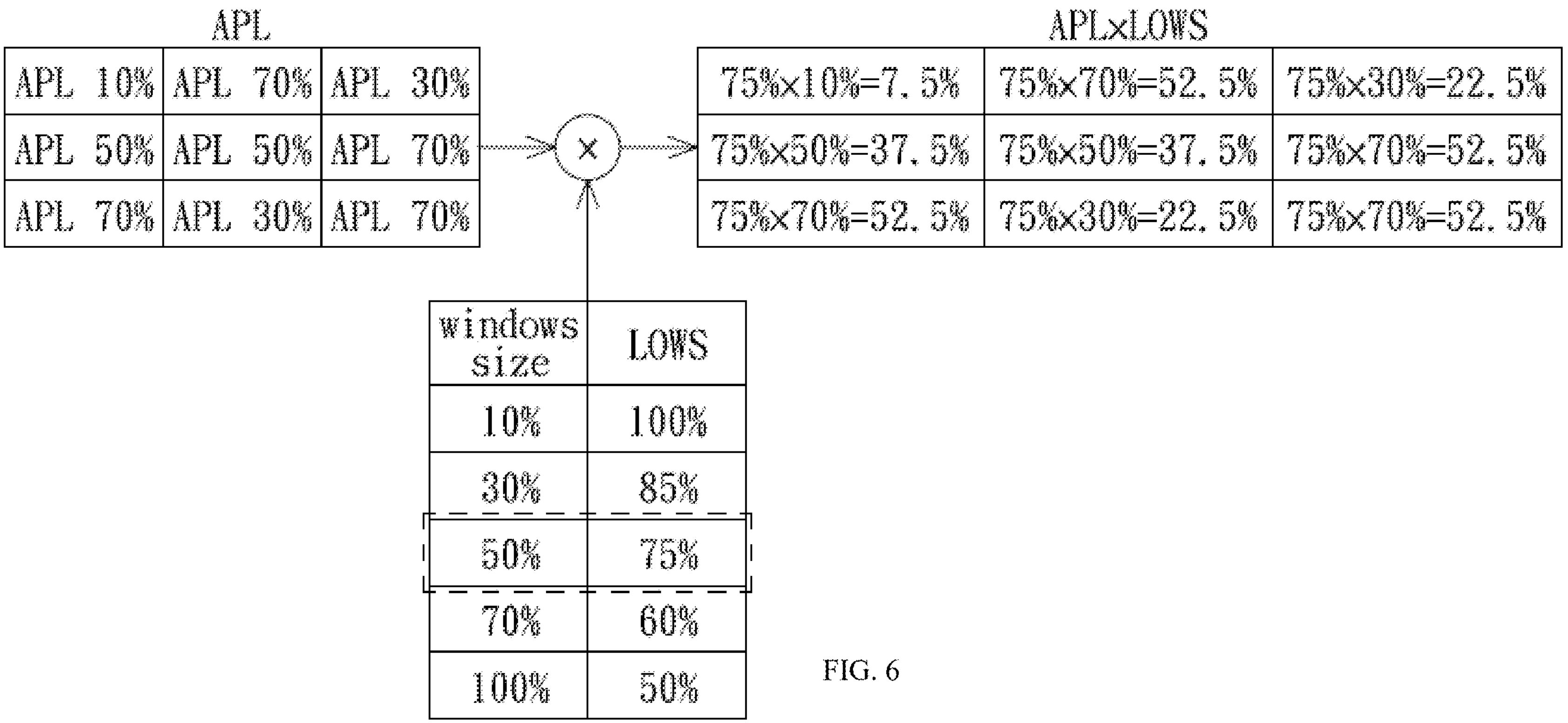
FIG. 6 is a schematic diagram of an area peak luminance and a product thereof with a luminance dependency of windows size according to an example of the disclosure.

Next, as shown in FIG. 4, the driving unit 4 can obtain a display luminance corresponding to each sub-millimeter light-emitting diode in each area 21 after performing the local dimming of the backlight unit 2, so as to obtain an area peak luminance/segment (APL) in the area 21. Next, the driving unit 4 finds out the corresponding luminance dependency of windows size (LOWS) according to the windows size of the backlight unit 2. The windows size is the ratio of the white screen area in the backlight unit 2 to the panel area of the whole backlight unit 2, and different ratios correspond to different luminance dependencies of windows size, as shown in Table 1. It can be found that the windows size has an inverse relation with the luminance dependency of windows size. In addition, the white screen area in the backlight unit 2 and the panel area of the whole backlight unit 2 may be in different shapes, such as a rectangle and a polygon, but the disclosure is not limited thereto. Next, the driving unit 4, after obtaining the area peak luminance of each area 21 and the luminance dependency of windows size after the local dimming, performs a product of the area peak luminance of each area 21 and the luminance dependency of windows size (APL*LOWS) to obtain the display luminance of each area 21 in the backlight unit 2, so as to compensate each area 21 of the backlight unit 2. As shown in FIG. 6, the area peak luminance of each area 21 in the backlight unit 2 is shown on the right side in FIG. 6, the ratio of the white screen area in the backlight unit 2 to the panel area of the whole backlight unit 2 is, for example, 50%, the corresponding luminance dependency of windows size is 75%, and the product of the area peak luminance of each area 21 and the luminance dependency of windows size is, for example, shown on the left side in FIG. 6. In addition, it can be noted that the number of area peak luminances increases or decreases with the number of areas after the local dimming. FIG. 6 only shows an example, and the disclosure is not limited thereto.

TABLE 1

| Windows size | Luminance dependency of windows size |
|---|---|
| 10% | 100% |
| 30% | 85% |
| 50% | 75% |
| 70% | 60% |
| 100% | 50% |

Based on the above, according to the display and the backlight compensation method display provided by the disclosure, by compensating for the luminance difference after the local dimming of the backlight unit and adjusting the luminance dependency of windows size of the backlight unit according to different windows sizes, the optical quality can be maintained without reducing the resolution of the image data, and the luminance and the gamma value can be maintained under different windows sizes. In addition, the provided backlight compensation manner may be a composite condition other than area and luminance, and the disclosure is not limited thereto.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A backlight compensation method of a display, the display having a driving unit and a backlight unit, the backlight compensation method comprising:

providing a gamma value of the display;

performing local dimming of the backlight unit according to the gamma value;

obtaining an area peak luminance of each area in the backlight unit;

obtaining a windows size of the backlight unit and a corresponding luminance dependency of windows size;

obtaining, by the driving unit, a first display luminance corresponding to each area in the backlight unit according to a product of the area peak luminance of each area and the luminance dependency of windows size; and performing luminance compensation in each area of the backlight unit according to the first display luminance.

2. The backlight compensation method according to claim 1, wherein the performing the local dimming of the backlight unit according to the gamma value comprises:

normalizing a difference between a black screen grayscale measured value and a white screen grayscale measured value of the backlight unit as a base number, and raising the base number to the power of the gamma value, thereby obtaining a second display luminance of the backlight unit; and performing the local dimming of the backlight unit based on the second display luminance.

3. The backlight compensation method according to claim 1, wherein the gamma value is 2.2.

4. The backlight compensation method according to claim 1, wherein the windows size has an inverse relation with the luminance dependency of windows size.

5. The backlight compensation method according to claim 1, wherein the windows size is a ratio of a white screen area in the backlight unit to a panel area of the backlight unit.

6. A display, having a gamma value, the display comprising:

a backlight unit, having first display luminances, a windows size and a corresponding luminance dependency of windows size, the backlight unit having a plurality of areas, and each area having an area peak luminance; and a driving unit, coupling the backlight unit and calculating the first display luminance according to a product of each of the plurality of area peak luminances and the luminance dependency of windows size;

wherein each of the first display luminances corresponds to each area in the backlight unit.

7. The display according to claim 6, wherein the backlight unit further comprises: a black screen grayscale measured value, a white screen grayscale measured value and a second display luminance, and the second display luminance is obtained by normalizing a difference between the black screen grayscale measured value and the white screen grayscale measured value as a base number and raising the base number to the power of the gamma value.

8. The display according to claim 6, wherein the gamma value is 2.2.

9. The display according to claim 6, wherein the windows size has an inverse relation with the luminance dependency of windows size.

10. The display according to claim 6, wherein the windows size is a ratio of a white screen area in the backlight unit to a panel area of the backlight unit.

* * * * *